United States Patent [19]

Tsukamoto et al.

[11] Patent Number: 4,747,562
[45] Date of Patent: May 31, 1988

[54] RETRACTOR WITH BOTH EMERGENCY AND AUTOMATIC LOCKING MECHANISMS

[75] Inventors: Masahiro Tsukamoto, Fujisawa; Katsuo Takiura, Yokohama, both of Japan

[73] Assignee: Nippon Seiko Kabushiki Kaisha, Tokyo, Japan

[21] Appl. No.: 900,837

[22] Filed: Aug. 27, 1986

[30] Foreign Application Priority Data

Sep. 13, 1985 [JP] Japan .............................. 60-139458[U]

[51] Int. Cl.$^4$ ............................................. B65H 75/48
[52] U.S. Cl. ...................... 242/107.4 R; 242/107.4 A; 242/107.4 B
[58] Field of Search ................. 242/107.4 R, 107.4 A, 242/107.4 B

[56] References Cited

U.S. PATENT DOCUMENTS

| | | | |
|---|---|---|---|
| 4,436,255 | 3/1984 | Matsui et al. ................. | 242/107.4 A |
| 4,518,132 | 5/1985 | Schmidt ....................... | 242/107.4 A |
| 4,537,363 | 8/1985 | Thomas ........................ | 242/107.4 A |
| 4,552,319 | 11/1985 | Gavagan et al. ............ | 242/107.4 A |
| 4,555,075 | 11/1985 | Schmidt ....................... | 242/107.4 A |
| 4,565,338 | 1/1986 | Takada ......................... | 242/107.4 B |
| 4,566,649 | 1/1986 | Petersen, III ................ | 242/107.4 A |
| 4,572,457 | 2/1986 | Hirata ........................... | 242/107.4 B |
| 4,573,646 | 3/1986 | Willey ........................... | 242/107.4 R |

FOREIGN PATENT DOCUMENTS 59-85248 6/1984 Japan .

*Primary Examiner*—Stuart S. Levy
*Assistant Examiner*—Katherine Matecki
*Attorney, Agent, or Firm*—Wegner & Bretschneider

[57] ABSTRACT

A retractor is equipped with an emergency locking mechanism and an automatic locking mechanism. It is allowed to change the automatic locking mechanism from a state ready to actuate to a state not ready to actuate and vice versa by suitably changing the wound state of the webbing on a take-up spindle.

7 Claims, 8 Drawing Sheets

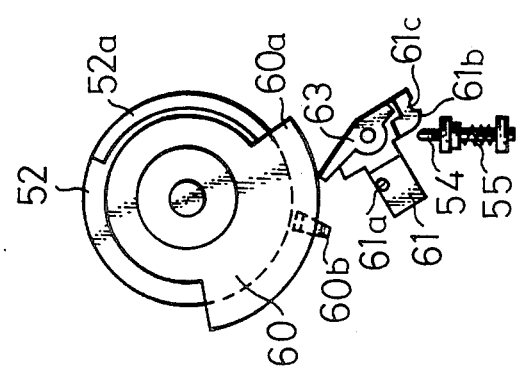
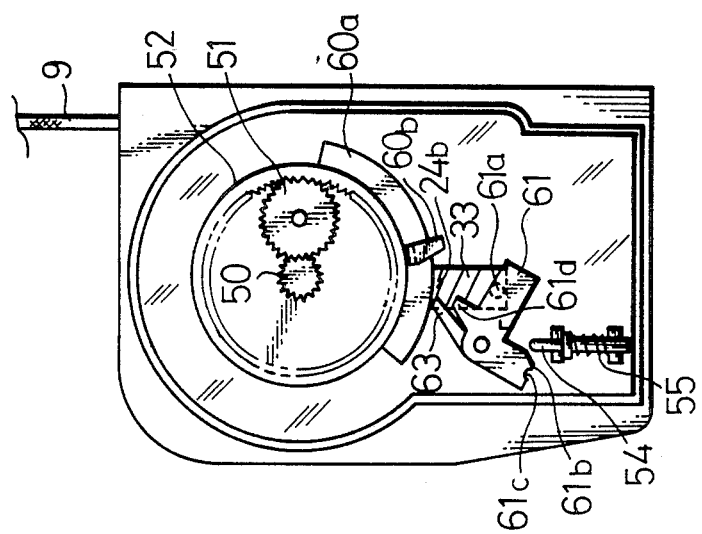

RETRACTOR WITH BOTH EMERGENCY AND AUTOMATIC LOCKING MECHANISMS

BACKGROUND OF THE INVENTION

1. Field of the Invention

This invention relates to a retractor which is equipped with an emergency locking mechanism and an automatic locking mechanism—which once the rotation of a take-up spindle in the webbing-releasing direction is locked, continuously locks the take-up spindle unless this locking is released by a certain operation—and allows to change the automatic locking mechanism from a state ready to actuate to a state not ready to actuate and vice versa by suitably changing the wound state of the webbing on the take-up spindle.

2. Description of the Prior Art

Retractors equipped solely with either emergency locking mechanisms or automatic locking mechanisms have conventionally been known. Even while webbings are worn, the former retractors permit a relatively greater degree of freedom to the wearers and the wearers do not feel too much pressures from the webbings. The release of webbings is prevented in the case of the latter retractors, and the wearers hence feel relatively large pressures from the webbings.

Baggage or an auxiliary child's seat (hereinafter called "baggage" collectively) is sometimes strapped on a conventional passenger seat by using its associated webbing. In the case of an automatic locking retractor, the release of the webbing is prevented when the baggage is strapped. Therefore, the baggage is firmly held on the seat. However, the release of the webbing is not prevented normally in the case of an emergency locking retractor. There is hence an imminent danger that the webbing is pulled out little by little from the retractor by vibrations and moderate braking and the strapping of the baggage becomes looser while the car is driven.

It is hence desired to develop a retractor having the merits of both emergency locking retractor and automatic locking retractor.

SUMMARY OF THE INVENTION

With the foregoing in view, the present invention has as its primary object the provision of a retractor which can meet the above-mentioned demand without making the mechanism unduly complex or large.

In one aspect of this invention, there is thus provided a retractor with both emergency and automatic locking mechanisms, which comprises:

- take-up spindle means biased in the webbing-winding direction;
- a ratchet wheel mounted on the take-up spindle means;
- a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel, said pawl member normally assuming the second position;
- arm means capable of selectively taking a first state in which the arm means holds the pawl member at the first position or a second state in which the arm means holds the pawl member at the second position;
- means for holding the arm means in the first state, said holding means comprising a stopper pin engageable with the arm means, a spring biasing the stopper pin so as to normally maintain the stopper pin in contact with the arm means, and a recess formed in the arm means to receive the stopper pin;
- detection means for detecting the state of winding of the associated webbing on the take-up spindle means;
- a control member for bringing the arm means into the first state, when the detection means detects attainment of a predetermined first wound state of the webbing through a predetermined course of operation or irrespective of the course of operation through which the predetermined first wound state has been achieved, or into the second state when the detection means detects attainment of a predetermined second wound state of the webbing in which the webbing has been wound on the take-up spindle means over a length longer than the wound length of the webbing in the predetermined first wound state; and
- a sensor for detecting a state of emergency and bringing the pawl member into the first position.

In another aspect of this invention, there is also provided a retractor with both emergency and automatic locking mechanisms, which comprises:

- a base;
- take-up spindle means supported rotatably on the base and biased in the webbing-winding direction;
- a ratchet wheel mounted on the take-up spindle means;
- a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel;
- control means for bringing the pawl member into the first position upon detection of attainment of a predetermined first wound state of the webbing through a predetermined course of operation or irrespective of the course of operation through which the predetermined first wound state has been achieved, or into the second position upon detection of attainment of a predetermined second wound state of the webbing in which the webbing has been wound on the take-up spindle means over a length longer than the wound length of the webbing in the predetermined first wound state, said control means having a first member interlocked with each rotation of the take-up spindle means, a second member movable following the first member with a time lag within a predetermined range whenever the direction of motion of the first member changes, and arm means capable of selectively taking a first state in which the arm means holds the pawl member at the first position or a second state in which the arm means holds the pawl member at the second position, said arm means being engageable only with the second member; and
- an emergency locking mechanism for preventing the take-up spindle means from rotating in the webbing-releasing direction in the event of an emergency.

According to the present invention, the control member or means detects the wound state of the webbing by sensing the rotation of the take-up spindle means by way of the free rotation mechanism and then controls the lock means of the automatic locking mechanism. The mechanism of the retractor is not unduly complex or large in spite of the incorporation of both emergency locking mechanism and automatic locking mechanism.

BRIEF DESCRIPTION OF THE INVENTION

The above and other objects, features and advantages of the present invention will become apparent from the following description and the appended claims, taken in conjunction with the accompanying drawings, in which:

FIG. 4 is a cross-sectional view of the retractor, as viewed in the direction indicated by arrows IV,IV in FIG. 2;

FIG. 5 is a cross-sectional view of the retractor, as viewed in the direction indicated by arrows V,V in FIG. 2;

DETAILED DESCRIPTION OF THE INVENTION AND PREFERRED EMBODIMENT

Figure 1:
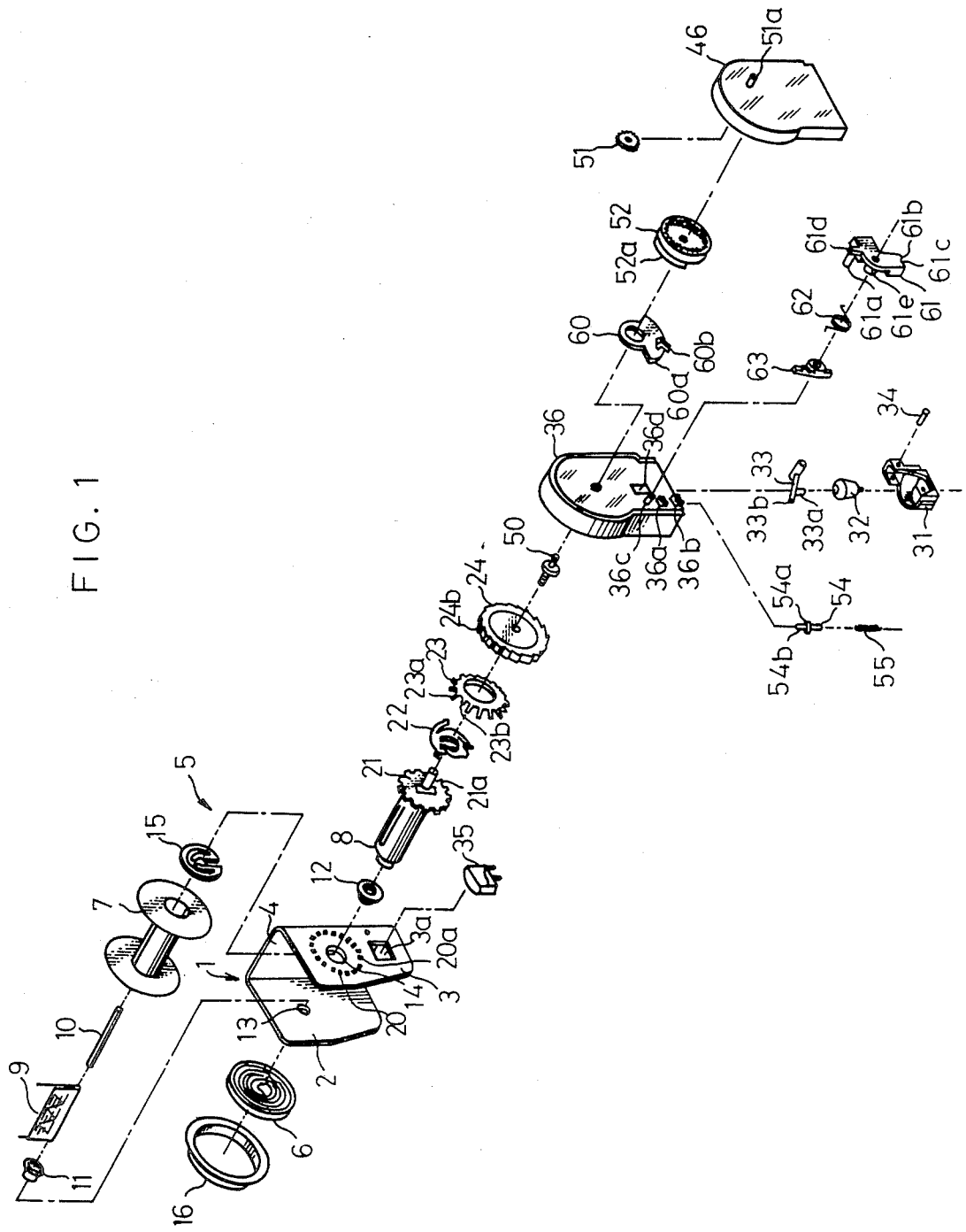
FIG. 1 is an exploded perspective view of a retractor according to one embodiment of this invention, which is equipped with both emergency locking mechanism and automatic locking mechanism.

Referring first to FIG. 1, a base 1 of the retractor has two side walls 2,3, which are opposite to each other, and a rear wall 4 extending between the side walls 2,3. Between the side walls 2,3, take-up spindle means 5 is rotatably supported. The take-up spindle means 5 is biased in the webbing-winding direction by means of a take-up spring 6. The take-up spindle means 5 includes a bobbin 7 and a shaft 8 extending through the bobbin 7. Slots are formed through the bobbin 7 and shaft 8, through which a webbing 9 extends. The inner end of the webbing 9 is fastened to a stop stick 10 so that the webbing 9 is prevented from slipping out of the bobbin 7 and shaft 8. The take-up spindle means 5 is supported via bushes 11,12 on the edges of circular through-holes 13,14, which are formed through the side walls 2,3 respectively. Axial movements of the take-up spindle means 5 are limited by a retainer ring 15.

The take-up spring 6 is enclosed under a cover 16 provided on the side wall 2.

A plurality of locking projections 20 are formed at an equal interval around the circular through-hole 14 on the side wall 3 of the base 1. The leading side of each of the projections 20 as seen in the clockwise direction in FIG. 1 serves as a latching surface 20a. A latch plate 21 is mounted on an outer end portion (i.e., a righthand end portion as seen in FIG. 1) of the shaft 8 in such a way that the latch plate 21 is allowed to rotate as a unitary member together with the shaft 8. On the outer periphery of the latch plate 21, a plurality of latching teeth 21a are formed at an equal interval.

Further outside the latch plate 21, a latch-up spring 22, a latch ring 23 and a latch frame 24 as a ratchet wheel are loose-fit successively on the shaft 8. The latch ring 23 is displaceable along the axis of the shaft 8 and is biased outwards by the latch-up spring 22. The latch ring 23 includes a plurality of L-shaped teeth 23a, the axially-extending portions of which are always maintained in engagement with the latching teeth 21a of the latch plate 21. The latch ring 23 is also provided with a projection 23b which is maintained in engagement with a cam surface 24a (see, FIG. 2) formed on the inner wall of the latch frame 24. On the outer peripheral wall of the latch frame 24, there are formed a plurality of teeth 24b directed in the webbing-releasing direction and adapted to engage a subsequently-described sensor arm as a pawl member.

When the pawl member engages the teeth 24b of the latch frame 24, members 20-23 interact to keep the spindle means 5 from rotating in the webbing-releasing direction. The manner in which members 20-23 interact is shown in more detail in U.S. Pat. No. 4,572,457 to Hirata.

A sensor case 31 is fixedly secured on a lower part of the side wall 3. A weight 32 as a sensor is mounted within the hollow space of the sensor case 31. In addition, a sensor arm 33 which has a projection 33a and a tip 33b and serves as a pawl member is provided swingably by a pin 34 on the sensor case 31.

On the inner surface of the side plate 3, there is also provided a dust cover 35 for preventing penetration of dust and the like through an opening 3a in which the sensor case 31 is secured. On the outer wall of the side plate 3, there is also provided a mounting member 36 which covers all members on the side wall 3 and also serves as a mounting base for the following members. Namely, a speed-reducing gear mechanism is provided on the mounting member 36. The speed-reducing gear mechanism is composed of a main gear 50 secured fixedly on the shaft 8, a subordinate gear 51 the rotary shaft 51a of which is received in a cover 46, and a follower 52 which serves as a first member and has internal teeth. A control plate 60 is loose-fit as a second member inside the follower 52.

Furthermore, a lock arm 61 and a stopper pin 54 which is biased upwards by a compression spring 55 are also provided on the mounting member 36. The stopper pin 54 is supported on a pair of supporting projections 36a,36b provided on the mounting member 36. The stopper pin 54 is hence allowed to undergo a linear movement until a flange part 54a of the stopper pin 54 is brought into contact with either one of the projections 36a,36b.

The lock arm 61 is swingable about a mounting pin 36c of the mounting member 36. A rod portion 61a of the lock arm 61 extends inwards through a window 36d of the mounting member 36. When the lock arm 61 swings upwards, namely, counterclockwise, the rod portion 61a acts on the sensor arm 33 and pushes the sensor arm 33 upwards.

Figures 2, 3:
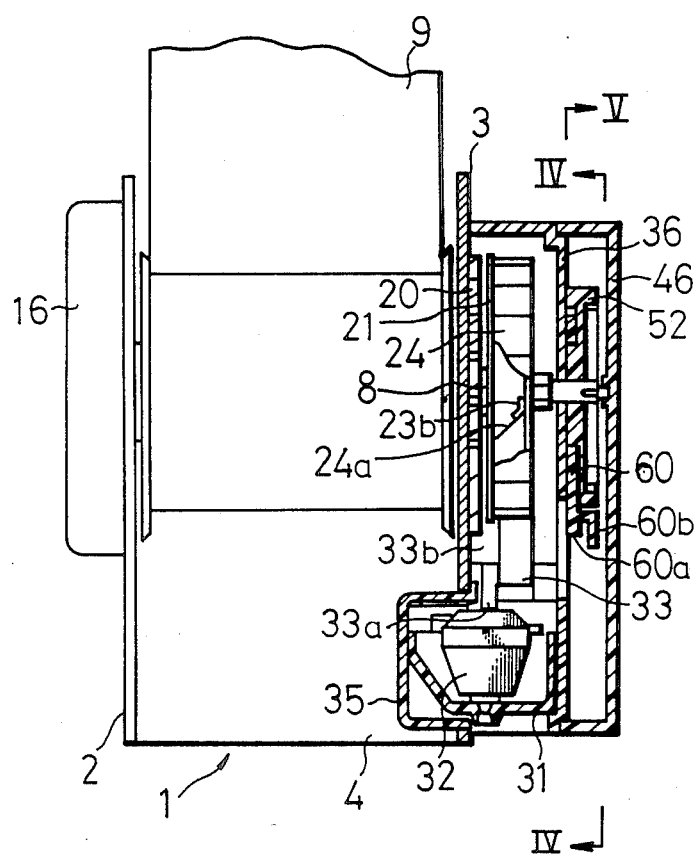
FIG. 2 is a partially cross-sectional front elevation of the retractor.
FIG. 3 is an enlarged fragmentary view of a lock arm.

The lower end face of the lock arm 61 has such a shape as depicted in FIG. 3. When the lock arm 61 swings upwards, the upper end 54b of the stopper pin 54 is caused to fall into a recess 61c by way of a tilted part 61b so as to maintain the lock arm 61 in an upwardly-swung position. When the lock arm 61 begins to swing downwards from the upwardly-swung position thereof, the upper end 54b is released from the recess 61c while the stopper pin 54 is slightly depressed downwards against the biasing force of the compression spring 55. As soon as the upper end 54b of the stopper pin 54 reaches the tilted part 61b, the force of the compression spring 55 acts on the lock arm 61 so that the lock arm 61 is rapidly brought to a downwardly-swung position thereof. At a projection 61d of the lock arm 61, the lock arm 61 is subjected to the action of the projection 60b of the control plate 60.

The control plate 60 provided inside the follower 52 is engageable with the follower 52 subsequent to a relative free rotation. A clutch arm 63 is connected to the lock arm 61 via a spring 62 in such a way that the clutch arm 63 is rotatable within a predetermined range.

The control plate 60 has a sectorial part 60a, which is engageable with the clutch arm 63, and the above-described projection 60b extending out at a level different from the sectorial part 60a. The projection 60b is engageable with a projection 61d of the lock arm 61.

The clutch arm 63 is turnable within a predetermined range about a pivot 61e of the lock arm 61 and is normally biased by the spring 62 in a direction in which the clutch arm 63 is normally caused to turn counterclockwise as seen in FIG. 1.

Control means is constructed by the above members 50–52, 54, 55 and 60–63, among which the members 50–52 forms detection means.

They are shown in their assembled state in the partially cross-sectional view of FIG. 2.

The operation of the retractor of the above embodiment will next be described. When the webbing is wound up over the entire length thereof, as illustrated in FIGS. 4 and 5 which are cross-sectional views seen in the directions indicated respectively by the arrows IV,IV and V,V in FIG. 2, the clutch arm 63 is maintained in engagement with the sectorial part 60a of the control plate 60 and is in a state turned clockwise as viewed in FIG. 4 against the force of the spring 62 while the lock arm 61 is in a state swung clockwise as viewed in FIG. 4. The rod portion 61a of the lock arm 61 is accordingly maintained apart from the sensor arm 33 and owing to its own weight, the sensor arm 33 assumes the second position where it is apart from the teeth 24b of the latch frame 24. Namely, the automatic locking mechanism is in a state not ready to actuate.

Figure 7:
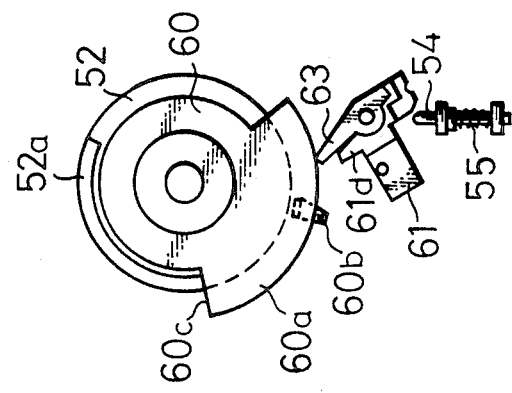
FIGS. 7, 9 and 11 are similar to FIG. 5 and illustrate the operation of the retractor.

When it is started to pull out the webbing, the follower 52 begins to turn counterclockwise as viewed in FIG. 7 first of all. The follower 52 is allowed to turn freely until a flange 52a of the follower 52 is brought into contact with one edge 60c of the sectorial part 60a of the control plate 60. As soon as the flange 52a is brought into contact with the edge 60c, the control plate 60 also starts turning counterclockwise as viewed in FIG. 7. Here, the projection 60b of the control plate 60 approaches, in the leftward direction as viewed in FIG. 6, the projection 61d of the lock arm 61. Since the lock arm 61 is in its downwardly-swung position, the projection 60b and projection 61d are not engageable and the projection 60b is allowed to turn freely past the projection 61b.

Figure 6:
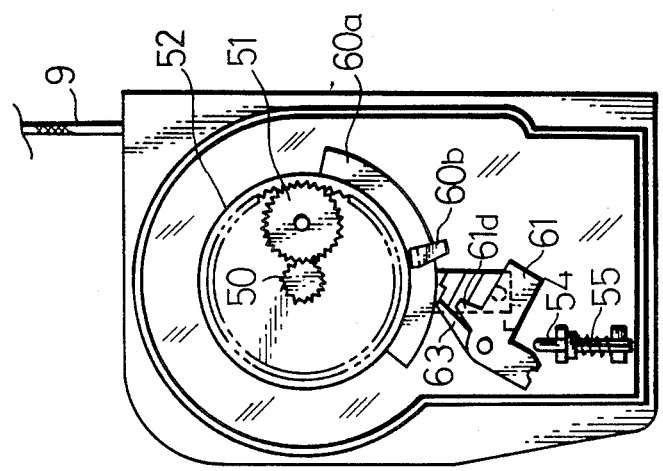
FIGS. 6, 8, 10 and 12-14 are similar to FIG. 4 and illustrate the operation of the retractor.
Figure 9:
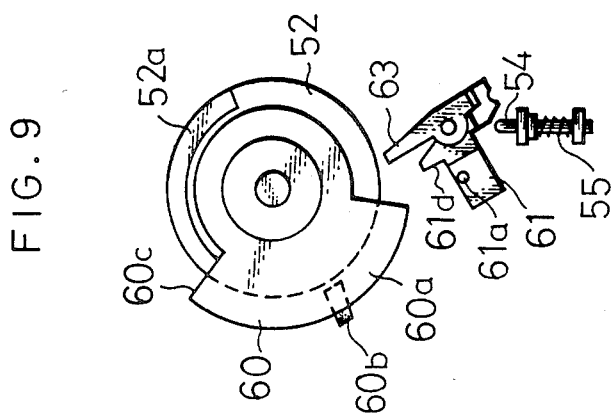
Figure 8:
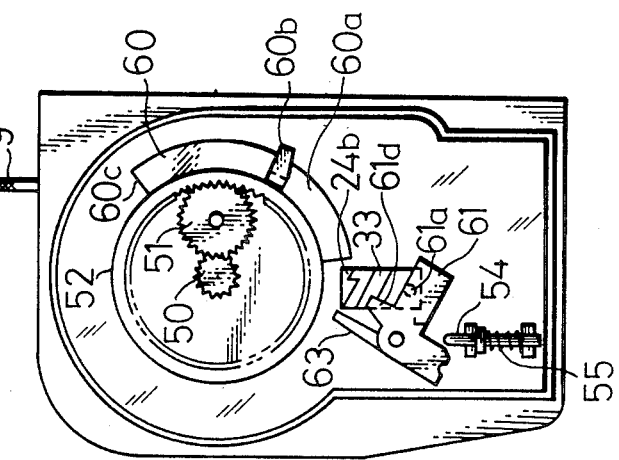

When the webbing 9 is pulled out further, the clutch arm 63 is disengaged from the sectorial part 60a and is then caused to swing counterclockwise as viewed in FIG. 6 by the force of the spring 62 into a state shown in FIGS. 8 and 9. In this state, the lock arm 61 and clutch arm 63 are both in their downwardly-swung positions and the rod portion 61a does not act on the sensor arm 33. Hence, the automatic locking mechanism is in a state not ready to actuate.

Figure 10:
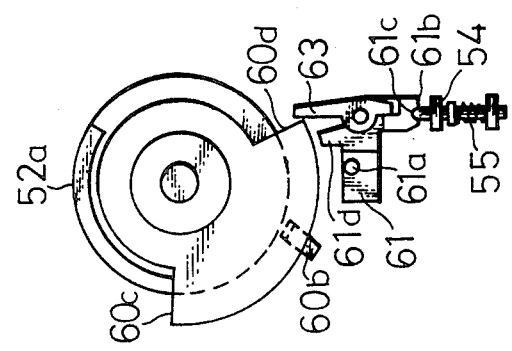
Figure 11:
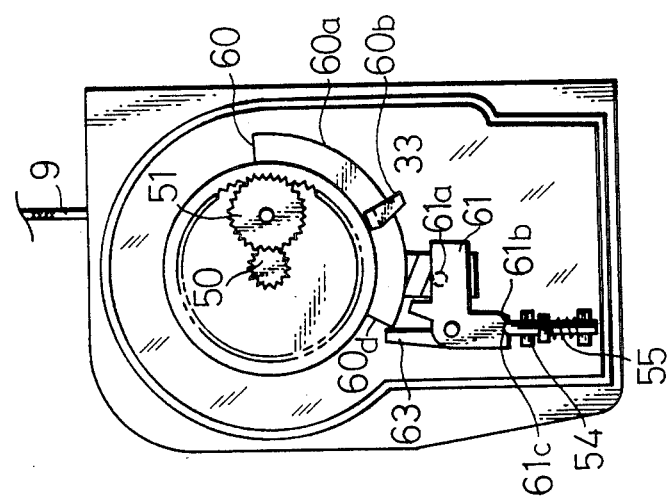

A further release of the webbing 9 causes the follower 52 and control plate 60 to turn clockwise as viewed in FIG. 8 into a state depicted in FIGS. 10 and 11. The other edge 60d of the sectorial part 60a is then turned by the force of the spring 62, so that the other edge 60d is brought into contact with the clutch arm 63 which is not turnable counterclockwise beyond its position. Therefore, the clutch arm 63 and lock arm 61 are turned counterclockwise as viewed in FIG. 10 so as to assume their upwardly-swung positions. By the action of the rod portion 61a, the sensor arm 33 is pushed upwards to assume the first position where the sensor arm 33 is engageable with the teeth 24b of the latch frame 24. Here, the webbing has reached the predetermined first wound state.

As a result of the above-described operation, the automatic locking mechanism is rendered ready to actuate.

When it is started to rewind the webbing from the above state, the follower 52 is allowed to undergo a predetermined free rotation until the flange 52a is brought into contact with the edge 60d of the control plate 60 (see, FIG. 11). Thereafter, the follower 52 engages the control plate 60 and begins to turn together with the control plate 60. This motion is depicted as a counterclockwise rotation in FIG. 12. Here, the lock arm 61 is held in the above-described upwardly-swung position under the influence of the stopper pin 54 which is biased upwards by the force of the spring 55. Therefore, the automatic locking mechanism is maintained ready to actuate.

Figure 12:
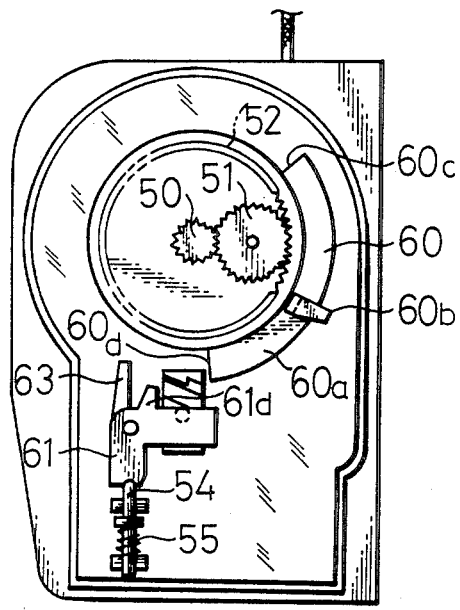
Figure 13:
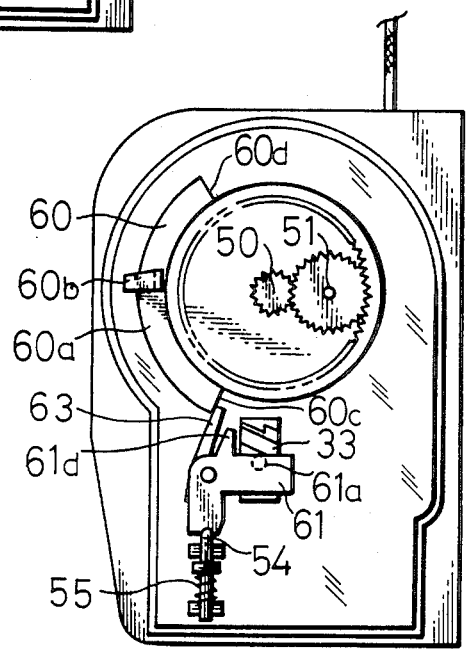
Figure 14:
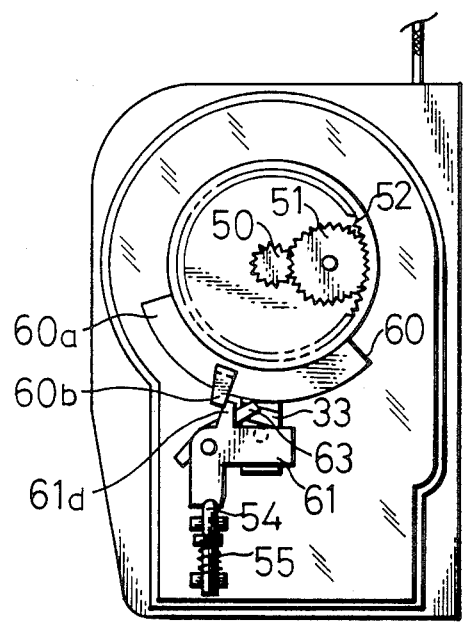

When the webbing has been taken up over a predetermined length thereof and has taken the predetermined second wound state, the edge 60c of the control plate 60 is brought into engagement with the clutch arm 63 in the rightward direction as viewed in FIG. 12 so that the clutch arm 63 is caused to turn clockwise as viewed in FIG. 13 against the force of the spring 62. When the clutch arm 63 is turned clockwise to a maximum degree in FIG. 13, the clutch arm 63 is caused to ride on the sectorial part 60a of the control plate 60. At this stage, the lock arm 61 is not allowed to turn clockwise and remains in its upwardly-swung position even when the control plate 60 is caused to turn counterclockwise as viewed in FIG. 13 as a result of winding of the webbing.

As soon as the projection 60b of the control plate 60 is brought in the rightward direction into engagement with the projection 61d of the lock arm 61, a clockwise turning force is applied to the lock arm 61 so that the lock arm 61 is turned clockwise against the force of the spring 55, said force being applied by way of the stopper pin 54. Therefore, the sensor arm 33 is again allowed to move downwards by its own weight so that the automatic locking mechanism is brought into a state not ready to actuate.

Since the retractor of the above embodiment is equipped with the free rotation mechanism and the clutch mechanism, which is composed of the clutch arm capable of absorbing the motion of the associated elements to the predetermined extent, in addition to the speed-reducing gear mechanism, the gear-dependent speed reduction is not required to achieve any high reduction ratio even if the rotation of the follower must be limited within a single rotation. It is hence unnecessary to employ a large-diametered follower to achieve a high reduction ratio. The mechanism is thus not required to achieve such a high reduction ratio, thereby permitting a compact structure.

In the above-described embodiment, the pawl member which is allowed to rotate with a time lag relative to the take-up spindle means is provided as the lock means for the emergency locking mechanism and automatic locking mechanism. When the pawl member turns with a time lag, the take-up spindle means is prevented from turning in the webbing-releasing direction. It should however be borne in mind that this mechanism is not necessarily limited to the above-described type. It may for example be possible to use such a type that the pawl member is displaced by the control means into direct engagement with the take-up spindle means so as to prevent the take-up spindle means from rotating in the webbing-releasing direction.

As to the point of time at which the lock means is changed from the non-locking state to the locking state, the above change is effected in the above embodiment when the webbing has taken the predetermined wound state on the take-up spindle means, irrespective of the course of operation taken to reach the above state. It may however be possible to take such a course of operation into consideration, namely, to effect the above change when the control means has detected the attainment of the predetermined wound state of the webbing through a certain course of operation.

Having now fully described the invention, it will be apparent to one of ordinary skill in the art that many changes and modifications can be made thereto without departing from the spirit or scope of the invention set forth herein.

What is claimed is:

1. A retractor with both emergency and automatic locking mechanisms, comprising:
    a base;
    take-up spindle means supported rotatably on the base and biased in a webbing-winding direction;
    a ratchet wheel mounted on the take-up spindle means;
    a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel;
    control means for bringing the pawl member into the first position upon detection of a predetermined first amount of the webbing wound on the take-up spindle means through a predetermined course of operation or irrespective of the course of operation through which the webbing has been taken up on the take-up spindle means to the predetermined first amount, or into the second position upon detection of a predetermined second amount of the webbing wound on the take-up spindle means, said second amount being longer than said first amount, said control means having a first member movable responsive to each rotation of the take-up spindle means, a second member movable following the first member with the predetermined degree of free rotation relative to the first member whenever the direction of motion of the first member changes, and arm means capable of selectively taking a first state in which the arm means holds the pawl member at the first position or a second state in which the arm means is maintained out of engagement with the pawl member, said arm means being engageable only with the second member; and
    an emergency locking mechanism for preventing the take-up spindle means from rotating in the webbing-releasing direction in the event of an emergency;
    wherein the second member has first and second engagement portions, and the arm means has a clutch arm and a lock arm equipped with a projection, said first engagement portion being engageable with the clutch arm to bring the arm means into the first state, said second engagement portion being engageable with the projection of the lock arm to bring the arm means into the second state.

2. The retractor as claimed in claim 1, wherein emergency lock mechanism has a sensor which upon sensing a speed change of at least a predetermined value applied to the base, actuates to bring the pawl member into the first position.

3. The retractor as claimed in claim 1, wherein the first member is connected to the take-up spindle by way of a speed-reducing gear mechanism.

4. The retractor as claimed in claim 1, wherein the first and second engagement portions extend out at different levels relative to the axial direction of take-up spindle means.

5. The retractor as claimed in claim 1, wherein the lock arm and clutch arm are removable relative to each other within a predetermined range.

6. The retractor as claimed in claim 1, further comprising means for holding the arm means in the first state, said holding means comprising a stopper pin engageable with the lock arm, a spring biasing the stopper pin so as to normally maintain the stopper pin in contact with the lock arm, and a recess formed in the lock arm to receive the stopper pin.

7. The retractor as claimed in claim 6, wherein the lock arm has a tilted surface which facilitates engagement of the stopper pin in the recess.

* * * * *